Patented Mar. 10, 1925.

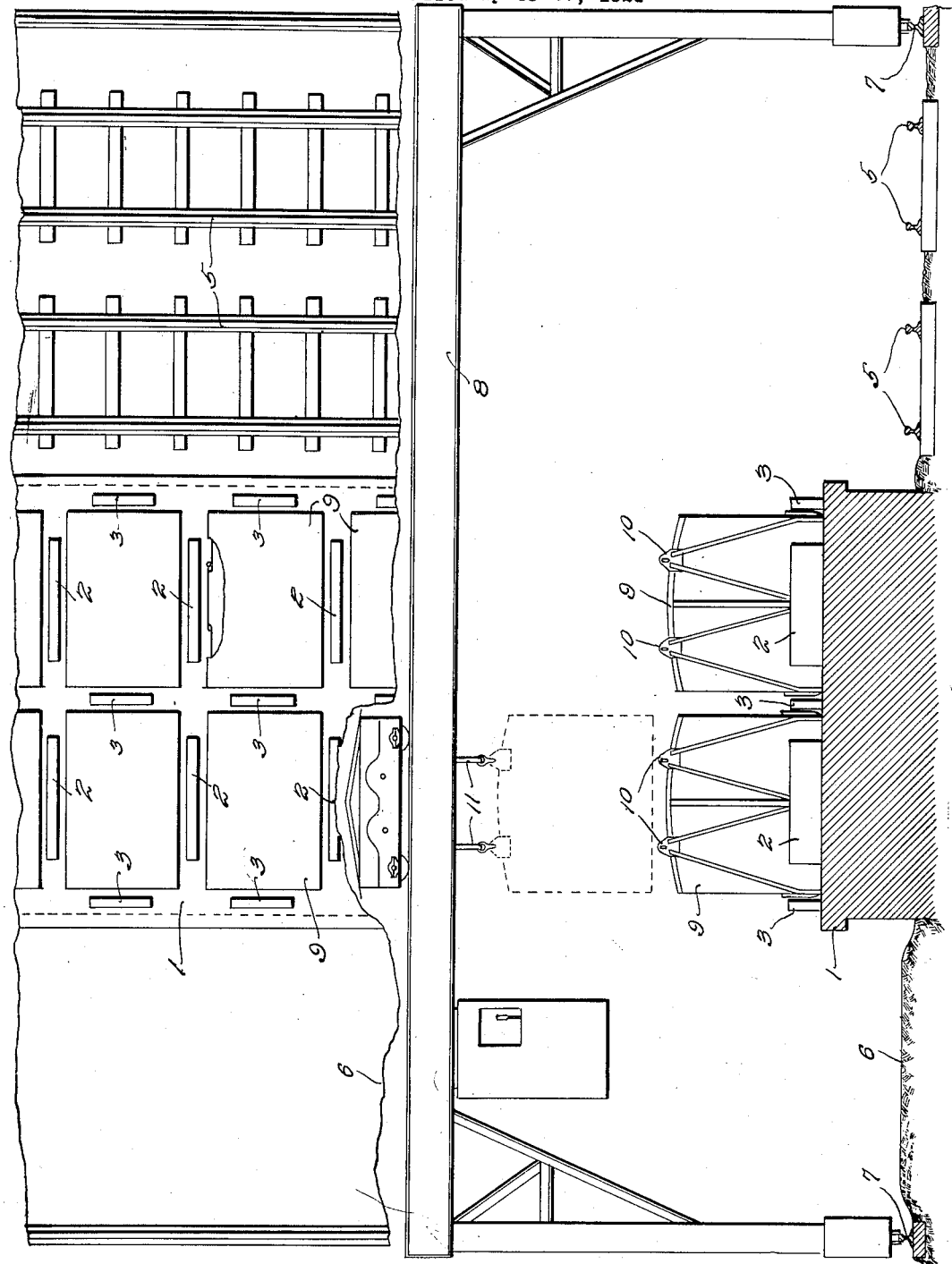

1,528,955

UNITED STATES PATENT OFFICE.

ALFRED H. SMITH, OF CHAPPAQUA, NEW YORK.

LOADING AND UNLOADING PLATFORM.

Application filed April 28, 1921. Serial No. 465,346.

*To all whom it may concern:*

Be it known that I, ALFRED H. SMITH, a citizen of the United States, residing at Chappaqua, in the county of Westchester and State of New York, have invented certain new and useful Improvements in Loading and Unloading Platforms, of which the following is a specification.

There is coming into general use a system of handling freight, express and the like in less than carload lots in containers which are removably secured to railroad cars and when loaded on cars it is impossible for any one to gain access to the containers to remove the goods from the containers, whereby the theft and loss of goods is eliminated, thus resulting in a great saving to the railroads inasmuch as the claims for lost and stolen goods are eliminated.

When these compartments are removed from the car and placed upon a platform there might possibly be a chance of some one breaking the locks on the doors of the compartments and thereby removing goods from the compartments, and it is the object of my invention to prevent the unauthorized opening of the containers while they are resting on the loading or unloading platform.

A further object of my invention is to provide in loading and unloading platform a series of grouped abutments between which the compartments are placed, the abutments extending vertically a material distance above the lower edge of the door of the compartment placed between them so that even if one succeeds in breaking the locks of the door of the compartment it will be impossible to open the door because of the abutment whereby I extend the insurance against theft from the containers while they are resting upon the loading or unloading platforms; and with these and other objects in view my invention consists of the parts and combination of parts as are hereinafter set forth.

In the drawing—

Figure 1 is a top plan view of the loading and unloading platform embodying my invention.

Figure 2 is a vertical transverse sectional view through the platform, roadway and railway tracks showing a Gantry crane co-operating therewith.

Reference numeral 1 designates a platform of suitable construction upon which freight may be loaded and unloaded, said platform being provided with abutments 2 and 3 projecting vertically a material distance above the surface of the platform and preferably arranged in groups of four, as illustrated. These abutments may be arranged in any desired manner and may be of any desired shape so long as at least one of the abutments in the group will be positioned in front of the door of the container placed between the abutments, whereby the door of the container cannot be opened so long as the container is positioned between the abutments.

Reference numeral 5 designates railroad tracks on one side of the platform and numeral 6 designates a roadway for trucks and other vehicles.

Reference numerals 7 designate rails placed at the extreme outer side limits of the freight receiving station upon which is mounted a Gantry crane, or other crane, 8.

When the railroad car arrives at the platform having thereon containers 9 which are provided with suitable lifting arms 10 to which the hook 11 of the crane may be attached for the purpose of lifting the containers off of the car and placing them on the truck in the roadway 6, or placing them between the abutments of the platform heretofore referred to. These containers are provided with doors, as shown, which doors are secured by suitable locks. When the containers are on the cars there is an abutment on the car which prevents the unauthorized opening of the door of the container, thereby preventing the theft of the goods contained in the container while the container is on the car. When the container is removed from the car and placed between the abutments on the platform at least one of the abutments is positioned in front of the door of the container and sufficiently close thereto to prevent the unauthorized opening of the door of the container and the consequent theft of goods.

The abutments may be arranged to suit containers of varying sizes or more than one container may be placed between a given group of abutments because the containers are made in various sizes, but the large containers are always multiples of the smaller containers so that one or more of the containers may be arranged within a given group of abutments.

I am aware that certain changes may be made in the details of construction and arrangement of the abutments without departing from the scope of the appended claims.

What I claim is:

1. A loading and unloading platform having barriers disposed thereon a predetermined distance apart, in combination with a freight container having a door, and adapted to be positioned between said barriers, whereby the door of the container cannot be opened while the container is between said barriers.

2. A loading and unloading station including a platform, adapted to receive thereon freight containers having a hinged door, and a fixed abutment on said platform adapted to prevent the opening of the door of the container while the container is on the platform.

3. A loading and unloading station including a platform and a fixed upwardly extending abutment, said abutment being adapted to enclose the lower part of a freight container to prevent the door of the container being opened while the container is on the platform.

4. A loading and unloading station including a platform, vertically disposed barriers extending longitudinally of the platform, and vertically disposed barriers extending transversely of the platform, and adapted to receive a freight container between them and whereby the door of the container cannot be opened because of the proximity of an adjacent barrier.

In testimony whereof I affix my signature.

ALFRED H. SMITH.